(12) United States Patent
De Macedo

(10) Patent No.: US 7,646,306 B2
(45) Date of Patent: Jan. 12, 2010

(54) ARRANGEMENT INTRODUCED IN A HIDDEN RECEIVER-SENDER DELIMITER FOR PNEUMATICS AND SIMILARS

(75) Inventor: Milton Flávio De Macedo, São Bernardo do Campo (BR)

(73) Assignee: Techinvest Ltda, Sao Paulo (BR)

( * ) Notice: Subject to any disclaimer, the term of this patent is extended or adjusted under 35 U.S.C. 154(b) by 413 days.

(21) Appl. No.: 10/561,120

(22) PCT Filed: Jun. 16, 2004

(86) PCT No.: PCT/BR2004/000094

§ 371 (c)(1),
(2), (4) Date: Nov. 13, 2006

(87) PCT Pub. No.: WO2004/112294

PCT Pub. Date: Dec. 23, 2004

(65) Prior Publication Data

US 2007/0115106 A1    May 24, 2007

(30) Foreign Application Priority Data

Jun. 18, 2003    (BR) ................................ 8300869 U

(51) Int. Cl.
*G08B 13/14* (2006.01)
*B60C 23/00* (2006.01)

(52) U.S. Cl. ................ 340/572.8; 340/10.1; 340/693.5; 340/447; 73/146.5

(58) Field of Classification Search ............. 340/572.8, 340/10.1, 693.5, 447; 73/146.5
See application file for complete search history.

(56) References Cited

U.S. PATENT DOCUMENTS 5,731,957 A    3/1998    Brennan ..................... 361/728

(Continued)

*Primary Examiner*—Daniel Wu
*Assistant Examiner*—Brian Wilson
(74) *Attorney, Agent, or Firm*—Husch Blackwell Sanders Welsh & Katz

(57) ABSTRACT

ARRANGEMENT INTRODUCED IN A HIDDEN RECEIVER-SENDER DELIMITER FOR PNEUMATICS AND SIMILARS, especially a constructive arrangement allowing the use of a transponder (device to send and receive radio frequency signals) in aggressive means, be them chemical, mechanical or others, with no losses which may cause damage to said transponder; the conventional transponder (T) for emission and reception of radio frequency signals (RF) composed by a chip (1) and a coil reel (2); the transponder (T), with its new features, may be used, with no prejudice to its features, in aggressive chemical or mechanical means; the transponder (T) receives two protections: the first one by covering the transponder set (T) with a plastic film (F); the second protection is the introduction of said transponder (T), already with the first protection, inside a capsule (3) with special features, made of transparent material to electromagnetic waves and appropriate to resist against different mechanical efforts, be them twisting, flexion, traction or even mechanical vibrations, being the employed material preferably a plastic provided not only with transparence to electromagnetic waves, but also relative flexibility.

16 Claims, 2 Drawing Sheets

U.S. PATENT DOCUMENTS

| | | | |
|---|---|---|---|
| 5,920,290 A | 7/1999 | McDonough et al. | 343/873 |
| 5,958,648 A * | 9/1999 | Nishimura et al. | 430/270.1 |
| 6,067,016 A | 5/2000 | Deschenes et al. | 340/572.8 |
| 6,097,293 A | 8/2000 | Galloway et al. | 340/572.8 |
| 6,147,659 A | 11/2000 | Takahashi et al. | 343/866 |
| 6,191,691 B1 * | 2/2001 | Serrault | 340/572.8 |
| 6,734,532 B2 * | 5/2004 | Koduri et al. | 257/632 |
| 7,331,367 B2 * | 2/2008 | Koch et al. | 152/152.1 |
| 2002/0075145 A1 * | 6/2002 | Hardman et al. | 340/442 |

\* cited by examiner

CORTE A-A

ARRANGEMENT INTRODUCED IN A HIDDEN RECEIVER-SENDER DELIMITER FOR PNEUMATICS AND SIMILARS

BRIEF PRESENTATION

The present application for a Utility Model Patent refers to a novel device projected to allow the use of a transponder (sender and receiver device for radio frequency signals) in aggressive means, be them of mechanical, chemical or other origin, not causing losses which could cause damage to said transponder.

STATE OF THE ART

As it is widely known, a transponder comprises a coil reel and a chip interconnected to said reel.

In the current state of the art, said components (reel and chip) do not receive any protection for use in different applications.

However, the use of transponders in different fields has found different means of application, with building solutions adapting to keep their functionality, such as the capacity to store data such as identification, location and others, with the purpose to promote a better control of the receiver products of said transponders.

Such situations or applications often include chemical or mechanical means, among others, in which the aggression to the transponder would be naturally forecasted, so to make its use for this application become unfeasible or, when allowed, generate very reduced working life which would end up by compromising the project.

In the so-called chemical means, the transponder becomes fully unprovided of any protection (for both chip and reels), i.e. not provided with efficient covering, thus causing its deterioration from chemical reactions in contact with said chemical means.

In the case of mechanical means, we mention as an example the use of a transponder inside tires, since the material used to manufacture tires is usually transparent to electromagnetic waves. However, the fact to be highlighted is that, inside the tires, temperature may reach about 100° C., and there is also very strong twisting, notably due to the large tonnage (especially in the case of cargo transportation vehicles—the most desired ones—and passenger transportation vehicles); besides said twisting, very intense vibration is established.

With this purpose, the current state of the art has attempted, specifically in the case of protection in mechanical means, to manufacture a kind of "shell", which serves as a "capsule" for the tranponder. This "shell" is usually made of an epoxy resin material or similar. With temperature and vibration, the epoxy resin—which is very hard and consequently rigid—starts breaking easily the antenna wires, causing obvious problems related to the efficiency of the transponder.

OBJECTS OF THE PATENT

In this Utility Model, a covered and encapsulated transponder is disclosed, or a capsule to house said transponder, so to obtain a transponder which use is extremely efficient, resistant and durable for chemical, mechanical or other means requiring full sealing and resistance against mechanical efforts of twisting, traction, compression and others. In other words, the transponder is then double protected.

This application contemplates the covering of the transponder from the use of transparent film to electromagnetic waves, i.e. both of the wire forming the reels but also the chip which is a part of the transponder, so to make it become fully able to be employed in chemical means, since it becomes resistant against the attack of chemicals, acids and others, being this one the first protection. Subsequently, this set, after being duly covered, is encapsulated in a cover formed by a male and a female portion which fit themselves to provide perfect chemical sealing, completing the protection for use in such conditions. This capsule is made of transparent material to electromagnetic waves, such as a product of the group of plastics with relative flexibility, and makes the set become also resistant against mechanical efforts, such as twisting, flexion, traction and others; this capsule constitutes the second protection.

In the mechanical use as an example herein, such as inside tires, there is characteristic large twisting caused by the temperature, weight and turning of tires, besides the naturally present vibration; for that purpose, this capsule creates an internal chamber in which the already covered transponder is housed so not to suffer damage which may compromise the operation of the transponder.

In other words, transponder covering by means of a plastic film determines the chemical isolation of the transponder and also offers mechanical isolation against vibration, promoting a certain damping. This is the first protection.

The already covered set as described above is introduced under pressure into a capsule of a polycarbonate material or similar, which has the purpose to absorb mechanical efforts, such as twisting and impact. For that purpose, said capsule has within it a housing in which the previously covered transponder fits under pressure, forming smooth arching determining a "spring" effect having the purpose to avoid the transponder to absorb vibration, as well as the random balance inside said capsule. Furthermore, the housing for the transponder within said capsule is such that, in case said capsule suffers very large twisting or impact which ends up by deforming it, the transponder is not damaged or deformed. This capsule is the second protection.

Therefore, from this process and the respective capsule, we can reach an efficient means to house the transponder, which is highly efficient under the conditions of use in various chemical and mechanical means.

DESCRIPTION OF THE FIGURES

The present invention will be described below with reference to the attached drawings, which show.

DETAILED DESCRIPTION OF THE PATENT

Figure 1:
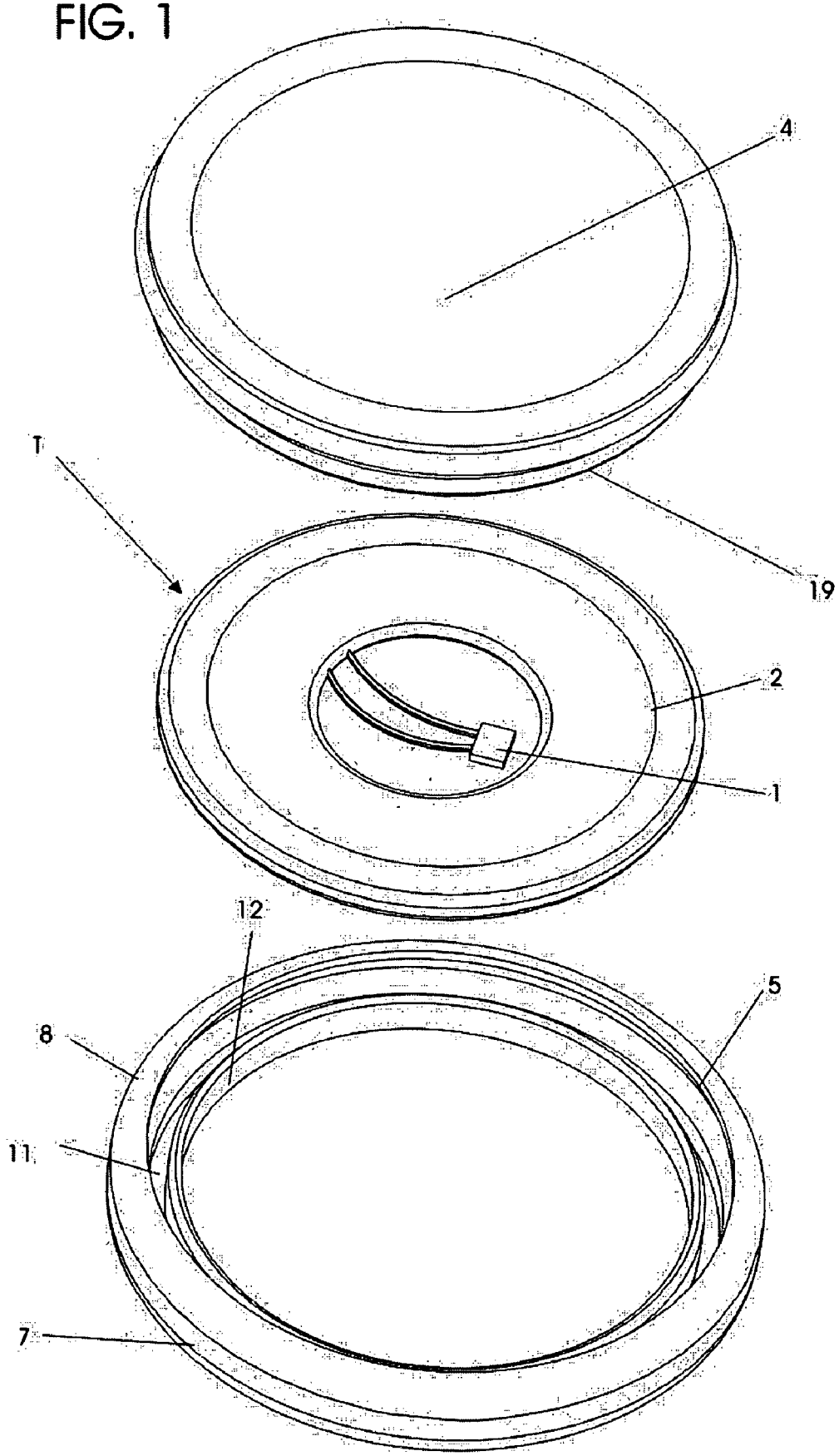
FIG. 1: exploded perspective view of the capsule and respective transponder, as already covered.
Figure 2:
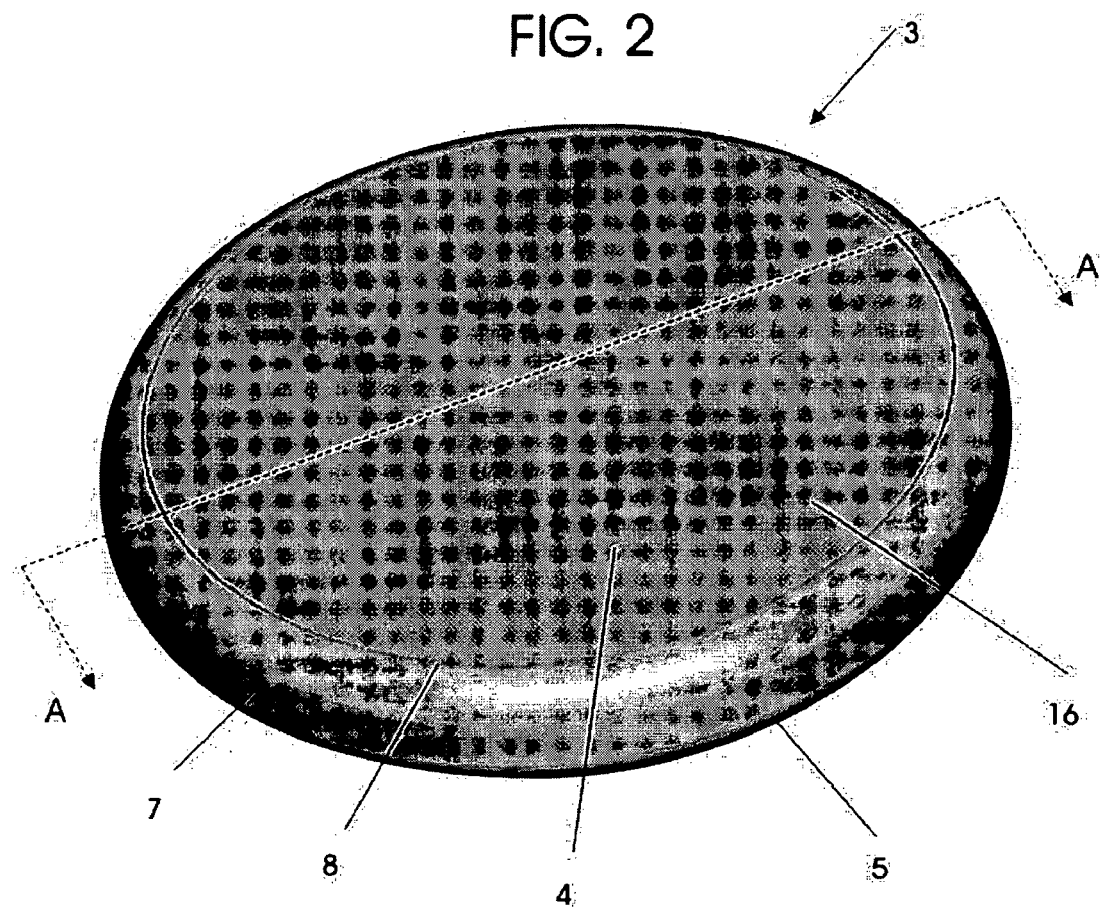
FIG. 2: perspective view of the capsule in the closed position, with the internal components (not shown), as will be used in the chemical or mechanical means.

The ARRANGEMENT INTRODUCED IN A HIDDEN RECEIVER-SENDER DELIMITER FOR PNEUMATICS AND SIMILARS object of this application for a Utility Model Patent consists of a conventional transponder (T) for emission and reception of radio frequency (RF) signals composed by a chip (1) and a coil reel (2), forming a device which, by means of especially developed protection, has the main purpose to provide conditions for the use of this transponder (T), with no prejudice to its features, in aggressive chemical or mechanical means, in this case if there are associated heat, mechanical efforts and vibration factors. With that purpose, the construction previews double protection, i. e.: in the first one, the covering of the transponder (T) by means of the plastic film (F) (isolating the set from chemical aggression and vibration); in the second one, said previously covered set is introduced inside a capsule (3), working to avoid the transponder (T) to be reached by twisting, impact and other mechanical efforts.

The capsule (3) integrating said constructive arrangement is made of transparent material to electromagnetic waves, appropriate to resist against various mechanical efforts, i. e. twisting, flexion, traction or even mechanical vibrations. The used material is preferably a polycarbonate provided not only with transparence to electromagnetic waves, but also relative pliability.

Thus, the transponder (T) construction is fully protected, i. e. including the chip (1) and the coil reel (2), from the use of a plastic film (F) which is resistant against naturally aggressive chemicals in general, being also transparent to electromagnetic waves, being this procedure preferably taken following a skill which may be covering, immersion or any other allowing said resource and having quick drying conditions.

Once covered, the transponder (T) may reply with full efficiency to the use in naturally aggressive chemical means, including acids, also isolating the vibration existent in conditions of use.

The transponder (T) is subsequently encapsulated, being introduced inside a capsule (3) of transparent material to electromagnetic waves and appropriate to resist against different mechanical efforts, some of which were already mentioned above, occurring e. g. inside a tire, which is used as an example in the present invention.

For that purpose, the transponder (T) is introduced between the male (4) and female (5) portions of said capsule (3), which are compatible with the dimension and configuration characteristics of the transponder (T).

The female portion (5) of the capsule (3) is provided with a compact base (6) giving origin to the equally compact side (7) forming a smooth end rim (8), so that the internal wall of that side configures a small straight path (9), distal from the compact base (6), followed by a "V" shape deepening (10) and the latter by a retracted bottom housing (11) which has its width limited by a ring wall (12), which height extends up to about the vertex of the mentioned "V" deepening (10), with said ring wall (12) having a bevel (13) on the side of the male portion (4) and rounding (14) on the side of the transponder (T). The bottom (15) of this compact base (6) is located at a level above the retracted bottom (11).

On the other hand, the male portion (4) discloses a compact top (16), which diameter is substantially compatible with the straight path (9) of the female portion (5), with said top (16) incorporating a corresponding straight path (17) followed by a projection substantially in "V" (18) which is coupled and fits under relative pressure to the deepening in "V" (10), while an equally ring-shaped rim (19) is settled over the retracted bottom (11), so to be restrained by the ring wall (12). Therefore, the male (4) and female (5) portions are fitted within themselves under considerable pressure which increases under conditions of use, being their accidental or even deliberate separation very difficult.

Figure 3:
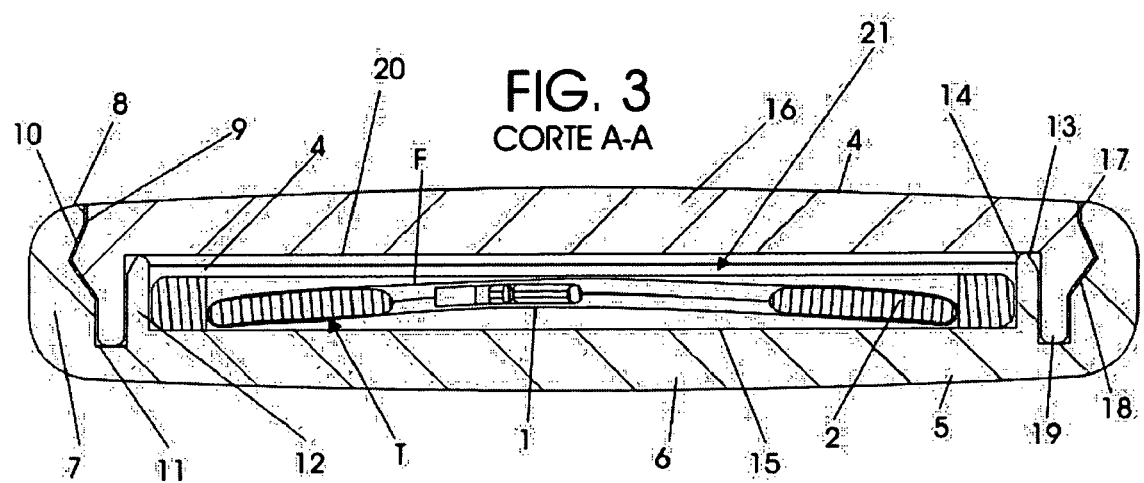
FIG. 3: cut view of the capsule with the transponder inside it.

Between the bottom (15) of the compact base (6) and the maximum height of the ring wall (12), coinciding with the bottom (20) of the compact top (16), a chamber (21) is created, inside which the transponder (T), already with the first projection, is housed, with a diameter adjustment existing in said chamber very near to the internal diameter of the ring wall (12), with said chamber (21) also having dimensions to fit the transponder (T), already with the first protection, under adequate pressure, creating a "spring effect" which can be observed in the smooth arching of FIG. 3, thus forbidding that it balances randomly inside the chamber (21), eliminating any vibration. As we can observe still in FIG. 3, said chamber (21) configured in the capsule (3) of the second protection has such dimensions to allow that, after a huge twisting or impact over the capsule (3), the transponder (T) does not happen do deform, thus guaranteeing to keep its features very efficiently.

The invention claimed is:

1. A transponder for the emission and reception of radio frequency signals comprising, a chip and a coil reel, a plastic film covering, said chip and said coil reel, said transponder thus covered, being housed between male and female portions of a capsule, said female portion comprising a compact base connected to an equally compact side forming a smooth end rim, the internal wall of said compact side has an edge with a configuration comprising a small straight path, distal from said compact base, followed by a "V", shape indentation followed by a retracted bottom housing which has its width limited by a ring wall, said ring wall extends up about the vertex of said "V" indentation, with said ring wall having a bevel on the side of the male portion and rounded edge on the other side; the bottom of said compact base is located at a level above the retracted bottom; the male portion comprises a compact top whose diameter is substantially compatible with the straight path of the female portion, with said top comprising an attachment portion, comprising a correspondence straight path followed by a "V"-shaped projection which is coupled and fits under relative pressure to the "V" shaped indentation of the female portion, while an equally ring-shaped rim is settled over the retracted bottom, so to be restrained by the ring wall; said male and female portions become fitted between them under considerable pressure; a chamber is created between the bottom of the compact base and the maximum height of the ring wall, coinciding with the bottom of the compact top, inside which the transponder is housed, with a diameter adjustment existing in said chamber very near to the internal diameter of the ring wall.

2. The device of claim 1, wherein said chamber has dimensions to allow the covered transponder to fit under pressure, forming smooth arching determining a "spring" effect having the purpose to avoid the transponder to absorb vibration, as well as the random balance of inside capsule and, in case of huge twisting or impact over the capsule, the transponder does not happen to deform.

3. The device of claim 1, which is employed in aggressive chemical or mechanical means, with no prejudice to the functions of the transponder, since it presents double protection; the first one from the cover by the plastic film or similar immersion or any other form allowing said resource and being able to quickly dry chemical and mechanical insulation; and the second one through the capsule made of transparent material to electromagnetic waves and appropriate to resist against various mechanical efforts, be them twisting, flexion, traction or even mechanical vibrations, being the employed material preferably a polycarbonate provided not only with transparence to electromagnetic waves, but also relative flexibility.

4. The device of claim 1, in which the covering, allows the transponder to respond, in a fully efficient way, to the use in naturally aggressive chemical means, including acids.

5. The device of claim 1, in which said capsule is formed of transparent material to electromagnetic waves and appropriate to resist against mechanical efforts.

6. The device of claim 5 in which the chamber has dimensions to allow the covered transponder to fit under pressure, forming smooth arching determining a "spring" effect having the purpose to avoid the transponder to absorb vibration, as well as the random balance inside the capsule and, in case of huge twisting or impact over the capsule, the transponder (T) does not happen to deform.

7. An electrical device for transmitting or receiving electric signals, comprising:
A transponder;
a film, coating said transponder;
a thin capsule, enclosing said film coated transponder within a chamber, said capsule comprising:
a base portion; and
a top portion, said top portion securely interlocking with said base portion to form the chamber, said chamber being of a size as to cause the transponder to form an arch within the chamber, said transponder fitting snugly in the chamber between the base portion and the top portion to prevent damage from vibration.

8. The device of claim 7, wherein said base portion further comprises:
a platform for said transponder;
a ring wall around said platform; and
a side wall around an edge of said base portion; and
wherein said top portion further comprises:
a cover portion; and
an attachment wall, said attachment wall structured and arranged to fit snugly between said ring wall and said side wall of said base portion.

9. The device of claim 8, further comprising:
a groove on an interior side of said side wall; and
a protrusion on an exterior side of said attachment wall, said protrusion structured and arranged to mate with said groove in a manner that snugly secures said top portion to said base portion.

10. The device of claim 9, wherein said groove extends along a middle portion of said side wall.

11. The device of claim 8, wherein said attachment wall extends below said platform when said top portion and said base portion are secured to each other.

12. The device of claim 7 wherein said transponder comprises a chip and a coil reel.

13. The device of claim 7, wherein said film is formed or a substance which prevents said transponder from being damaged by chemicals, including acids, while not interfering with said transponder's functionality.

14. The device of claim 7, wherein said film is plastic.

15. The device of claim 7, wherein said capsule is formed of a material that does not interfere with electromagnetic waves and is strong enough to resist forces associated with twisting, flexion, traction or even mechanical vibrations.

16. The device of claim 7, wherein said capsule is formed of a polycarbonate provided not only with transparence to electromagnetic waves, but also relative flexibility.

* * * * *